P. V. SNOW.
PHOTOGRAPHIC PRINTS ON METAL.
APPLICATION FILED MAR. 3, 1921.
Reissued May 10, 1921. 15,103.
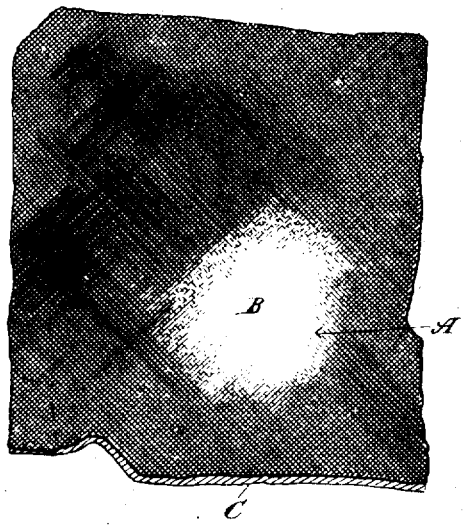
INVENTOR
Philo V. Snow.
BY George Cook & Son
ATTORNEY

UNITED STATES PATENT OFFICE.

PHILO V. SNOW, OF CHICAGO, ILLINOIS, ASSIGNOR TO THE RADIOTONE PHOTO CO., OF CHICAGO, ILLINOIS, A CORPORATION OF ILLINOIS.

PHOTOGRAPHIC PRINTS ON METAL.

15,103. Specification of Reissued Letters Patent. Reissued May 10, 1921.

Original No. 1,346,140, dated July 13, 1920, Serial No. 323,121, filed September 11, 1919. Application for reissue filed March 3, 1921. Serial No. 449,532.

*To all whom it may concern:*

Be it known that I, PHILO V. SNOW, a citizen of the United States, and a resident of Chicago, county of Cook, and State of Illinois, have made and invented certain new and useful Improvements in Photographic Prints on Metal, of which the following is a specification.

My invention relates to the production of prints on metal and has particularly to do with both the process involved in the production of the prints and with the completed article.

The object of my invention is to provide a photograph, wash drawing, or other pictorial representation, on metal, so produced as to present a highly artistic and pleasing appearance, having individuality, radiance and color, as well as depth, tone and luster, far superior, so far as I am aware, to any print heretofore produced.

A further object of my invention is to produce a print on metal wherein the picture will stand out in a vivid and realistic manner, will contain to a surprising degree, warmth, depth and color, and also will present a highly artistic and radiant appearance, due to the presence of local portions possessing increased light reflecting or diffusing value, thus intensifying the high lights of the picture and giving greater luster and contrast.

A further object is to provide a method for producing prints possessing the above characteristics, and which process may be readily carried out with uniform efficient results.

One feature of my invention is disclosed in the accompanying drawing, which forms a part of this specification.

In making a print containing the characteristic features of my invention and produced under my new process, a negative is first made from a photograph. This negative may be obtained from a camera, or may be in the nature of a half tone, or possess any other desired characteristic. A metallic surface is then prepared for the reception of a sensitizing solution and to this end I preferably employ a sheet of metal such as copper, brass, silver, gold plate, etc., which metal plate is thoroughly cleaned so as to remove stains, spots, grain or other blemish, and is given a polish. The polished metallic surface is then evenly coated with a sensitizing solution in the usual manner, the sensitizing solution being of such quality as to withstand rubbing and properly receive a dye. The picture is then printed from the negative directly on the sensitized metal sheet.

The print having been thus made and developed, it is next dyed with a suitable dye of the desired color, as, for example, with an anilin dye, the color of the dye being chosen so as to both harmonize with the subject-matter of the picture and with the color of the metal sheet.

The surface of the print is then rubbed so as to produce an even tone or shade and remove any stains or streaks which may be left by the dye, this step being preferably carried out while the print is still wet.

The print is then dried, which is preferably accomplished by laying a chamois skin on the metal print and squeegeeing the same, although this drying may be carried out in other ways, as will be readily appreciated.

After the print has been thus dyed, rubbed and dried, it is more or less dull and flat, and in order to give it depth, radiance and luster, it is then polished, which I have found may be expeditiously carried out by using a mixture of substantially four parts of powdered charcoal and one part of pumice stone, which mixture is applied in a dry state to the print and rubbed down with a piece of cotton batting until the desired smoothness, luster and relative effect is had. It will here be readily appreciated that this polishing may be carried out in other manners without departing from the spirit of my invention. The polishing of the print may be carried to the extent of either partially or completely removing local portions of the print or local portions of the half tone dots, so that an increased light reflection will take place from these local portions of the polished metal surface, thereby intensifying the high lights of the print and adding materially to its individuality, radiance, contrast and luster.

This feature of my print I have illustrated in the accompanying drawing, wherein a portion A of a half tone print has been polished or burnished, so that the area B has been left either partially or completely free from the picture or half tone lines or dots. Thus the area B will either partially or completely expose the polished metal plate C and an increased light reflection will take place at this area or portion, the result being an intensification of the high lights and a marked increase in the contract and luster of the print.

The print is then cleaned and given a final polish which may be effectively carried out by a clean sheet of chamois, after which the print is coated with a suitable preservative so as to prevent oxidation or deterioration. I have found that a suitable lacquer, which is either sprayed on or applied by dipping, forms a very desirable preservative coating.

After the print has been completed it may be framed or mounted on a suitable backing, and the warmth and color of the metallic sheet, combining and blending as it does with the dye, and the two being augmented by the brilliancy of the high lights, forms a most beautiful, as well as lasting, picture.

Having thus fully described and explained my invention, I claim and desire to secure by Letters Patent:

1. In a process for producing photographic prints on metal which includes making a negative, printing from said negative on a sensitized sheet of metal, developing the print, dyeing the print, removing stains and streaks from the dyed print, polishing the print, and coating the print with a preservative.

2. The steps in the process of producing photographic prints on metal, which consists in dyeing the metal print, removing the dye stains and streaks and giving the print an even tone by rubbing with soft material while the print is wet, and drying the print in a suitable manner.

3. The steps in the process of producing photographic prints on metal, which consists in dyeing the metal print, removing the dye stains and streaks and giving the print an even tone by rubbing with soft material while the print is wet, drying the print in a suitable manner, and polishing the print with a dry mixture of abrading materials applied by a soft material.

4. The steps in the process of producing photographic prints on metal, which consists in dyeing the metal print, removing the dye stains and streaks and giving the print an even tone by rubbing with soft material while the print is wet, drying the print in a suitable manner, and polishing the print with a dry mixture of pumice stone and charcoal applied with a piece of cotton batting.

5. The steps in the process of producing photographic prints on metal, which includes printing from a negative on a sensitized sheet of metal, the metal being coated with a sensitizing solution capable of withstanding brisk rubbing and abrading, dyeing the print, rubbing the dyed print to remove uneven tones and shades while the same is wet, drying the print, and polishing the print.

6. The steps in the process of producing photographic prints on metal, which includes printing from a negative on a sensitized sheet of metal, the metal being coated with a sensitizing solution capable of withstanding brisk rubbing and abrading, dyeing the print, rubbing the dyed print to remove uneven tones and shades while the same is wet, drying the print, polishing the print to give luster and relief, and burnishing the high-lights to a greater degree to intensify the same.

7. In a process for producing photographic prints on metal which includes making a negative, printing on a sensitized metal plate which has been cleaned and smoothed before being sensitized, developing the print, dyeing the print, removing stains and streaks from the dyed print, drying the print, burnishing the print with suitable materials, intensifying the high-lights, rubbing the print to produce a final polish, and coating the print with a preserving lacquer.

8. A process for producing photographic prints on metal which includes printing from a negative on a sensitized sheet of metal, developing the print, dyeing the print, polishing the print, and coating the print with a preservative.

9. In a process for producing photographic prints on metal which includes making a negative, printing from said negative on a sensitized sheet of metal, developing the print, dyeing the print, removing stains and streaks from the dyed print, and polishing the print.

10. The steps in the process of producing photographic prints on metal, which consists in dyeing the metal print, removing the dye strains and streaks and giving the print an even tone, by rubbing.

11. The steps in the process of producing photographic prints on metal, which consists in dyeing the metal print, rubbing the print while the same is wet, drying the print, and polishing the print.

12. The steps in the process of producing photographic prints on metal, which consists in dyeing the metal print, rubbing the print while the same is wet, drying the print, polishing the print, and coating the print with a preservative.

13. The steps in the process of producing photographic prints on metal, which consists in dyeing the metallic print, rubbing the print while wet, drying the print, and polishing the print with abrading material.

14. The steps in the process of producing photographic prints on metal, which consists in dyeing the metal print; removing the dye stains and streaks and giving the print an even tone, by rubbing with soft material while the print is wet, drying the print in a suitable manner, and polishing the print with a mixture of pumice stone and charcoal.

15. The steps in the process of producing photographic prints on metal, which includes printing from a negative on a sensitized sheet of metal, the metal being coated with a sensitizing solution capable of withstanding brisk rubbing and abrading, dyeing the print, rubbing the dyed print to remove uneven tones and shades, drying the print, and polishing the print.

16. The steps in the process of producing photographic prints on metal, which includes printing from a negative on a sensitized sheet of metal, the metal being coated with a sensitizing solution capable of withstanding brisk rubbing and abrading, dyeing the print, rubbing the dyed print to remove uneven tones and shades, polishing the print to give luster and relief, and burnishing the high-lights to a greater degree to intensify the same.

17. In a process for producing photographic prints on metal which includes making a negative, printing on a sensitized metal plate which has been cleaned and smoothed before being sensitized, developing the print, dyeing the print, burnishing the print with suitable materials, intensifying the high-lights, rubbing the print to produce a final polish, and coating the print with a preservative.

18. A process of the class described consisting in sensitizing a polished sheet of metal, printing and developing a pictorial representation upon said sensitized sheet of metal, dyeing the print, removing portions of the print to more fully expose the underlying reflecting metallic surface, and coating the print with a transparent preservative.

19. An article of the class described comprising a metallic surface, a picture printed thereon, portions of the print partially or completely removed and causing an increased light reflection from these portions.

20. An article of the class described comprising a polished metallic surface, a picture or pictorial representation printed and developed thereon, portions of said picture partially or completely removed, causing an increased light reflection from said portions.

21. An article of the class described comprising a polished metallic surface having a desired color by reflection, a pictorial representation printed thereon, a dye harmonizing with the color of reflection of said metallic surface and combined with said pictorial representation, and portions of the picture having increased light reflecting properties, augmenting the high-lights of the picture.

22. An article of the class described comprising a polished metallic surface having a desired color by reflection, a pictorial representation thereon, a dye harmonizing with the color of reflection of said metallic surface and combined with said picture, portions of said picture partially or completely removed, exposing the light reflecting metallic surface, thereby intensifying certain portions of said picture, and a transparent protective coating upon said picture.

23. An article of the class described comprising a polished metallic surface, a half tone pictorial representation on said metallic surface, portions of said half tone picture partially or completely removed, causing increased light reflection from said portions.

24. An article of the class described comprising a polished metallic surface having a desired color by reflection, a half tone pictorial representation thereon, a dye harmonizing with the color of said metallic surface combined with and forming a part of said pictorial representation, portions of said half tone picture partially or completely removed, exposing the light reflecting metallic surface and intensifying portions of the half tone picture.

Signed at Chicago, county of Cook and State of Illinois, this 18th day of Feby, 1921.

PHILO V. SNOW.

Witnesses:
GARRETT BURGERT,
JAMES A. WALKER.